DUAL FREQUENCY RESONANT CIRCUITS

Filed March 22, 1954

INVENTORS
NILES L. BARLOW &
KARL L. NEUMANN
BY Charles H. Brown
ATTORNEY

United States Patent Office 2,855,508

Patented Oct. 7, 1958

2,855,508

DUAL FREQUENCY RESONANT CIRCUITS

Niles Linden Barlow, Mamaroneck, and Karl Ludwig Neumann, Yonkers, N. Y., assignors to Radio Corporation of America, a corporation of Delaware Application March 22, 1954, Serial No. 417,796

5 Claims. (Cl. 250—17)

Figure 1:
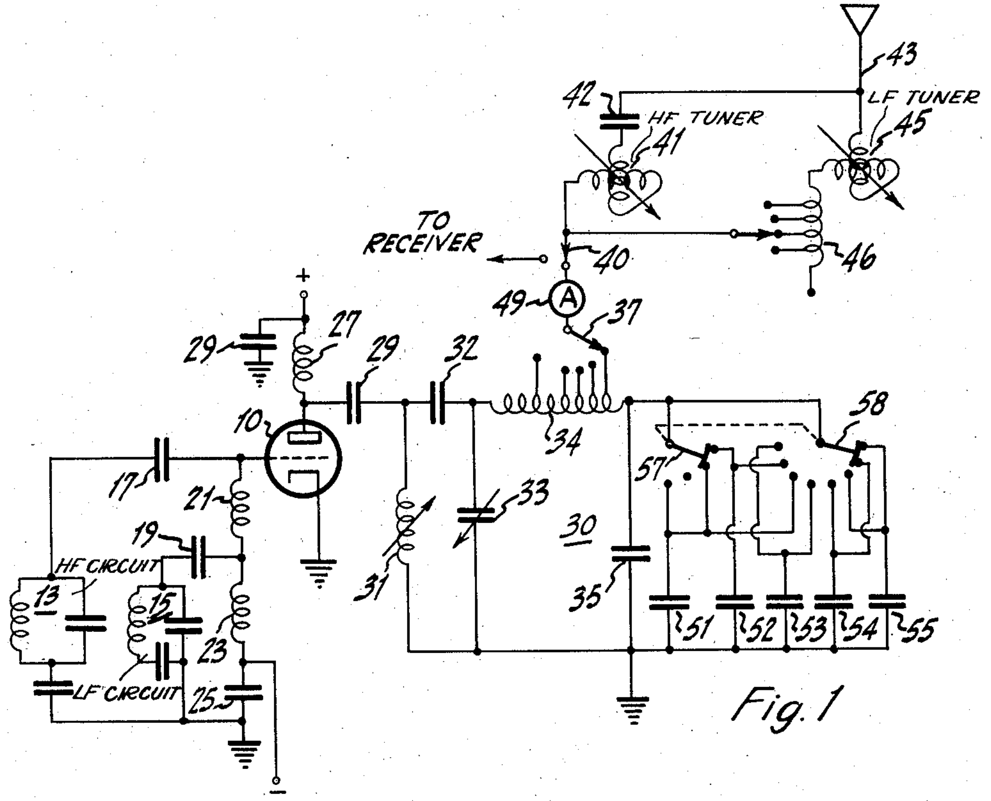

The invention relates to tuned radio frequency circuits, and particularly pertains to such circuit arrangements which can be tuned to resonance at two widely separated frequencies or bands of frequencies.

In the art of radio signaling it is often desirable, if not necessary, that a transmitter or a receiver be able to transmit or receive on either or both of two widely separated frequencies. Again, it is often desirable that the transmitter or receiver be operable on either or both of two frequencies without requiring any switching operation on the part of the operating personnel. Examples of such applications of the circuits described are found in maritime, fire-fighting, and other similar emergency signaling equipment.

At sea it is often desirable to send distress signals on some frequency in the 8.25–8.75 megacycles per second band, in addition to the usual 500 kilocycles per second international distress frequency, in order to insure greater certainty that signals will be heard at longer distances. The 8.25–8.75 mc./s. frequency is internationally available to surface craft as a calling and working frequency and can be used by anyone for distress transmissions. As a practical matter, transmissions on any frequency in the band will be intercepted by the guarding stations since it is the practice of these stations to tune throughout the high frequency band. For shipboard installations where trained operating personnel are available, adjustable circuits are invariably used. In lifeboat installations, where the operator may be a layman, it is highly desirable, if not necessary to the preservation of life, that the tuning of the radio equipment be as simple as possible. Heretofore, the equipment has required considerable adjustment and switching from one frequency band to another.

An object of the invention is to provide a practical circuit for use in the foregoing equipment which is parallel resonant at two widely separated frequencies.

Another object of the invention is to provide a circuit parallel resonant at two widely separated frequencies for use in radio signalling apparatus for operation at either of the frequencies without requiring any switching.

A further object of the invention is to provide such a circuit arrangement parallel resonant to two widely separated frequencies which can be pretuned at the factory so that the apparatus in which it is connected is always available for emergency use without requiring any retuning or adjustment.

Still another object of the invention is to provide a power amplifier output tank circuit parallel resonant at two widely separated frequencies and having a single output connection in which a single R. F. meter may be used to read the output current at either frequency without requiring any switching.

Still a further object of the invention is to provide a dual-resonant frequency tank circuit having impedance matching means individual to both frequencies and free from interaction one with the other.

The objects of the invention are obtained in a plural frequency filter network having three or more terminals and a plurality of sections connected therebetween. One section includes a shunt inductance element and a series capacitance element connected in parallel by means of components of the following section and resonated to the lower of the two frequencies. The following section includes a shunt variable capacitance component and a series arranged fixed inductance component which are connected in parallel by a further reactance member and resonated to the higher of the two frequencies. The output of the filter network is connected across the further reactance member, one end of which is preferably connected to a terminal in common with one of the input terminals to form a three-terminal network, the common terminal of which is also preferably connected to a point of neutral or fixed radio frequency reference potential, such as ground. Preferably, the shunt inductance element and the shunt capacitance component are variable in order to adjust the circuit to resonance at the two frequencies, although the adjustment can be made by variation of the series element or component if desired. The coupling to the utilization circuit is accomplished at the lower of the two frequencies by means of a variable capacitor connected across the further reactance member, while the coupling at the higher of the two frequencies is varied by adjusting the position of a tap on the series inductance component. Radio frequency output at both frequencies appears between the selected tap on the series inductance component and the point of fixed radio frequency reference potential.

When an antenna is used as a utilization device, the antenna circuit is tuned to operate at both frequencies by means of adjustable inductance and capacitance devices connecting the antenna lead-in wire to the selected tap on the fixed inductor.

Figures 2A, 2B:
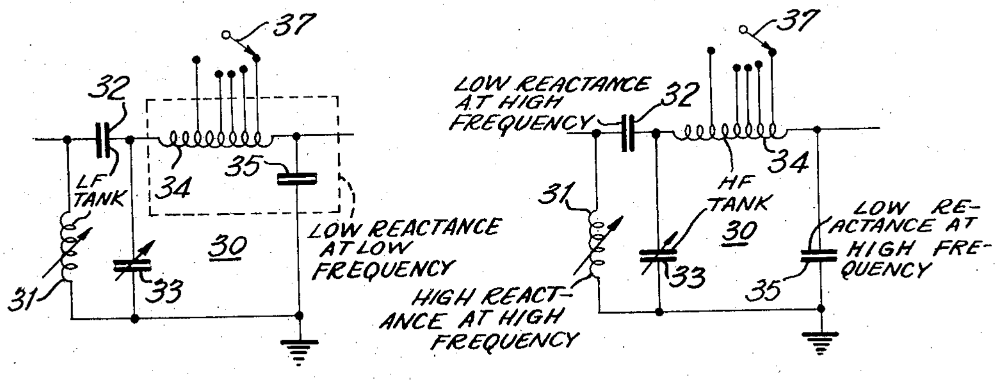

In order that the invention may be more readily understood and put to practical use an embodiment thereof, given by way of example only, will now be described with reference to the accompanying drawing, in which Fig. 1 shows a schematic diagram of a circuit arrangement according to the invention, and Figs. 2(*a*) and 2(*b*) are diagrammatic illustrations of the resonant circuits, given to explain the operation of the dual frequency networks of the invention.

Referrring to Fig. 1, there is shown a controlled electron flow device in the form of a power amplifier vacuum tube 10 which is arranged to amplify radio frequency currents at two widely differing frequencies. For example, the amplifier tube 10 may amplify continuous wave oscillations of 8.364 megacycles per second obtained from a high frequency (H. F.) resonant circuit 13 and continuous wave oscillations of 500 kilocycles per second obtained from a low frequency (L. F.) resonant circuit 15. These particular frequencies are those encountered in maritime emergency radio communications as previously stated. Obviously, the invention may be applied by those skilled in the art at other frequencies. These resonant circuits 13, 15 are coupled to the grid of the tube 10 by means of coupling capacitors 17 and 19 respectively, and the input circuit comprising a pair of series connected radio frequency grid chokes 21 and 23 and an R. F. bypass capacitor 25. Negative potential is applied to the junction between the grid choke 23 and the bypass capacitor 25 for biasing the tube 10 and/or modulating the output wave with a constant audio frequency if desired. An example of the latter circuit arrangement is shown in the copending U. S. patent application of one of the applicants, Niles L. Barlow, and William J. Winch, Jr., filed on March 22, 1954, and bearing the Serial No. 417,624. Positive anode potential is applied between the cathode electrode of the tube 10 and the anode electrode thereof by way of a radio frequency choke 27 with a radio frequency bypass capacitor 29 shunting the terminals of the power supply. Output from the tube 10 is applied by way of a blocking capacitor 29 to a dual frequency network 30 according to the invention.

The dual frequency network 30 comprises a dual-section, three-terminal filter network having a high impedance input and a low impedance output. A variable inductor 31 is shunted across an input terminal and a common terminal which is preferably connected to a point of neutral or fixed R. F. reference potential shown as ground. A series capacitor 32 is connected to the input terminal to form with inductor 31 the initial section of the network. A variable capacitor 33 connected between the other terminal of the series capacitor 32 and the common terminal and one end of a tapped inductor 34 form the following section of the network. A fixed capacitor 35 connected between the other end of the tapped inductor 34 and the junction of the shunt variable inductor 31 and the variable shunt capacitor 33 serves to connect the variable capacitor 33 and the tapped inductor 34 in electrically parallel relationship, while both the capacitor 35 and the tapped inductor 34 serve to connect the variable inductor 31 and the capacitor 32 in parallel. The tapped series inductor 34 and the fixed capacitor 35 exhibit a very low reactance at 500 kilocycles per second, thereby effectively connecting the capacitor 32 and the variable inductor 31 in electrically parallel relationship to resonate at that frequency. The variable capacitor 33 and the tapped inductor 34 are adjusted to resonance at a frequency of 8.364 megacycles per second, with the fixed capacitor 35 providing negligible reactance and effectively connecting the capacitor 33 and the inductor 34 in electrically parallel relationship. Radio frequency output at both 500 kilocycles per second and 8.364 megacycles per second appears between the output terminal at the junction between the tapped inductor 34 and the fixed capacitor 35 and the common terminal or ground. The inductance of the tapped inductor 34 is very small compared with that of the variable inductor 31 so that the effect of the tapped inductor on the 500 kilocycle per second resonant section of the circuit is negligible. The variable inductor 31 becomes a high reactance at the higher frequency shunting the 8.364 megacycles per second resonant circuit and having negligible effect on the resonance thereof, while the series capacitor 32 becomes a low reactance coupling capacitor at the higher frequency. Diagrammatic illustrations of the dual frequency networks at the low and high frequencies are given in Fig. 2(*a*) and Fig. 2(*b*) respectively.

A tap switch 37 is arranged to connect to various taps on the tapped inductor 34 in order to provide for optimum impedance matching and coupling of a utilization circuit to the dual frequency network at the higher frequency. In the example of the circuit arrangement according to the invention for use in a lifeboat transmitter-receiver combination, the utilization device is constituted by an antenna system having a transmit-receive switch 40 enabling the antenna system to be connected to either the transmitter or to a receiver, to which a variometer 41 and a series capacitor 42 connect to the antenna lead 43 for exciting the antenna with energy at 8.364 megacycles per second. Another variometer 45 and a series tapped inductor 46, the latter of which may be an integral part of the variometer 45, are connected between the transmit-receive switch 40 and the antenna lead 43 to tune the antenna for 500 kilocycles per second operation. A radio frequency (R. F.) ammeter 49 is inserted between the tap switch 37 and the transmit-receive switch 40 to read the output current to the antenna at either or both frequencies. Impedance matching at 500 kilocycles per second is accomplished by means equivalent to that of a variable capacitor connected in parallel with the fixed capacitor 35. This variable capacitor is effected by a plurality of fixed capacitors 51—55 which are connected to the circuit by means of a ganged switch having two sections 57 and 58. The capacity of variable capacitor 33 is very small as compared with the capacity of the coupling capacitors 51—55, so that the effect of the former on tuning and coupling at 500 kilocycles per second is negligible. Thus there is seen a filter comprising two resonant sections which pass frequencies lying in two widely separated bands of frequencies simultaneously or one at a time without switching and without interaction.

In an embodiment of the invention constructed and tested for use in a lifeboat transmitter the following component parts values were used for a dual frequency resonant circuit as shown in the drawing:

| Ref. No. | Part | Value |
|---|---|---|
| 10 | Tubes | 3 type 6146 connected in parallel. |
| 31 | Inductor | 90 microhenries, variable poly-iron core. |
| 32 | Capacitor | 1,000 mmfd. |
| 33 | do | 7-99 mmfd, variable. |
| 34 | Inductor | 3 microhenries. |
| 35 | Capacitor | 2,200 mmfd. |
| 51 | do | 1,500 mmfd. |
| 52 | do | 1,000 mmfd. |
| 53 | do | 510 mmfd. |
| 54 | do | 1,000 mmfd. |
| 55 | do | 510 mmfd. |

The power supply delivered 625 volts D. C. and the transmitter developed 30 watts at 500 kc./s. and 40 watts at 8.364 mc./s. into an antenna load of 10 and 40 ohms respectively. Obviously, those skilled in the art will employ parts of other values to suit the problem at hand.

The invention claimed is:

1. A dual frequency resonant network for operation at two predetermined frequencies comprising input, output, and common terminals, a first inductance connected between said input and said common terminals, a first capacitor having one end connected to said input terminal and having such value as to resonate with said first inductance at one of said predetermined operating frequencies, a second inductance connected between the other end of said first capacitor and said output terminal, a second capacitor connected between the junction of said first capacitor and said second inductance and said common terminal, said second capacitor having such value as to resonate with said second inductance at the other of said predetermined operating frequencies, and a reactance member connected between said output and said common terminals, said reactance member having such value as to resonate with said second inductance at said one predetermined frequency and to present a low impedance at said other predetermined frequency.

2. A dual frequency resonant network that presents a parallel resonant circuit at each of two widely separated operating frequencies, comprising input, output, and common terminals, a variable inductive element connected between said input and said common terminals, a fixed capacitive element having one end connected to said input terminal and having such value as to resonate with said inductive element at the lower frequency of said widely separated frequencies, a fixed inductive component connected between said output terminal and the other end of said capacitive element, a variable capacitive component connected between said common terminal and the junction of said capacitive element and said inductive component, said variable capacitive component having such value as to resonate with said inductive component at the higher frequency of said widely separated frequencies, and a capacitive reactance member connected between said output terminal and said common terminal, said capacitive reactance member having such value as to resonate with said inductive component at said lower frequency and to present a low reactance at said higher frequency.

3. A dual frequency resonant network that presents a parallel resonant circuit at each of two widely separated operating frequencies, comprising input, output, and common terminals, a variable inductive element connected between said input and said common terminals, a fixed capacitive element having one end connected to said input terminal and having such value as to resonate with said inductive element at the lower frequency of said widely separated frequencies, a tapped inductive component having one end connected to the other end of said capacitive element, a variable capacitive component connected between said common terminal and the junction of said capacitive element and said tapped inductive component, said variable capacitive component having such value as to resonate with said tapped inductive component at the higher frequency of said widely separated frequencies, a capacitive reactance member connected between the other end of said tapped inductive component and said common terminal, said capacitive reactance member having such value as to resonate with said tapped inductive component at said lower frequency and to present a low reactance at said higher frequency, and a movable tap switch connected to said output terminal for connecting said output terminal to the optimum tap on said tapped inductive component.

4. A dual frequency resonant network as described in claim 3, having a variable capacitor connected in parallel with said capacitive reactance member for obtaining an optimum impedance match between said network and a utilization circuit connected to said output terminal at said lower frequency.

5. A power amplifier and antenna system operable at two widely separated operating frequencies without switching, comprising a controlled electron flow device having an input circuit electrode, an output electrode circuit, and an electrode common to the input and output circuits thereof, means coupled between said input and common electrodes for applying radio frequency energy to said device at the lower frequency of said widely separated frequencies, means coupled between said input and common electrodes for applying radio frequency energy to said device at the higher frequency of said widely separated frequencies, a dual frequency resonant network coupled between said output and said common electrodes, said network comprising a coupling capacitor having one end connected to said output electrode, a variable inductive element connected between the other end of said coupling capacitor and said common electrode, a fixed capacitive element having one end connected to the junction of said coupling capacitor and said variable inductive element and having such value as to resonate with said inductive element at said lower frequency, a tapped inductive component having one end connected to the other end of said capacitive element, a variable capacitive component connected between said common electrode and the junction of said capacitive element and said tapped inductive component, said variable capacitive component having such value as to resonate with said tapped inductive component at said higher frequency, a capacitive reactance member connected between the other end of said tapped inductive component and said common electrode said capacitive reactance member having such value as to resonate with said tapped inductive component at said lower frequency and to present a low reactance at said higher frequency, a variable capacitor connected in parallel with said capacitive reactance member for obtaining an optimum impedance match at said lower frequency between said network and said antenna system connected to an output terminal, said antenna system including separately adjustable inductance elements connected in parallel between an antenna and said output terminal, and a movable tap switch connected to said output terminal for connecting said output terminal to the optimum tap on said tapped inductive component.

References Cited in the file of this patent

UNITED STATES PATENTS

| | | |
|---|---|---|
| 1,624,006 | Osnos | Apr. 12, 1927 |
| 1,627,767 | Brillouin et al. | May 10, 1927 |
| 1,706,030 | Kummer | Mar. 19, 1929 |
| 1,812,624 | Cummings | June 30, 1931 |
| 1,836,594 | Heising | Dec. 15, 1931 |
| 1,851,905 | Hayes | Mar. 29, 1932 |
| 2,151,814 | Tellegen | Mar. 28, 1939 |
| 2,154,692 | Mountjoy | Apr. 18, 1939 |
| 2,189,063 | Foster | Feb. 6, 1940 |
| 2,312,761 | Hershberger | Mar. 2, 1943 |
| 2,668,198 | Bussard | Feb. 2, 1954 |